United States Patent
Li

(10) Patent No.: US 11,095,322 B2
(45) Date of Patent: Aug. 17, 2021

(54) MULTIPLEXED ANTENNA AND METHOD FOR MULTIPLEXING ANTENNA

(71) Applicant: VIVO MOBILE COMMUNICATION CO., LTD., Chang'an Dongguan (CN)

(72) Inventor: Rihui Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/489,580

(22) PCT Filed: Dec. 27, 2017

(86) PCT No.: PCT/CN2017/119088
§ 371 (c)(1),
(2) Date: Aug. 28, 2019

(87) PCT Pub. No.: WO2018/157660
PCT Pub. Date: Sep. 7, 2018

(65) Prior Publication Data
US 2019/0393907 A1    Dec. 26, 2019

(30) Foreign Application Priority Data

Feb. 28, 2017 (CN) .......................... 201710114963.8

(51) Int. Cl.
*H04B 1/00* (2006.01)
*H01Q 23/00* (2006.01)
(Continued)

(52) U.S. Cl.
CPC .......... *H04B 1/0064* (2013.01); *H01Q 1/243* (2013.01); *H01Q 1/36* (2013.01); *H01Q 23/00* (2013.01); *H04B 1/3833* (2013.01)

(58) Field of Classification Search
CPC .......... H01Q 1/243; H01Q 5/20; H01Q 1/36; H01Q 23/00; H04B 1/0057; H04B 1/3833;
(Continued)

(56) References Cited

U.S. PATENT DOCUMENTS 9,203,137 B1 * 12/2015 Guterman ............... H01Q 1/243
9,876,276 B2 * 1/2018 Bengtsson ............... H01Q 9/30
(Continued)

FOREIGN PATENT DOCUMENTS

CN    102882539 A    1/2013
CN    104269605 A    1/2015
(Continued)

OTHER PUBLICATIONS

International Search Report related to Application No. PCT/CN2017/119068 dated Mar. 23, 2018.
(Continued)

*Primary Examiner* — Vibol Tan
(74) *Attorney, Agent, or Firm* — von Briesen & Roper, s.c.

(57) ABSTRACT

A multiplexed antenna and a method for multiplexing an antenna are provided. The multiplexed antenna includes an antenna unit and a signal separation circuit; the antenna unit is connected to a signal input terminal of the signal separation circuit, and configured to receive a superposition signal and send the superposition signal to the signal separation circuit via the signal input terminal; and the signal separation circuit is configured to separate the superposition signal into an antenna signal and a capacitive sensor signal. The method for multiplexing the antenna includes: receiving the superposition signal of the antenna signal and the capacitive sensor signal; and extracting the antenna signal and the capacitive sensor signal respectively from the superposition signal in accordance with operating frequencies of the antenna unit and a capacitive sensor in the multiplexed antenna.

10 Claims, 3 Drawing Sheets

(51) Int. Cl.
    *H01Q 1/24*    (2006.01)
    *H01Q 1/36*    (2006.01)
    *H04B 1/3827*  (2015.01)

(58) Field of Classification Search
    CPC ........ H04B 1/006; H04B 17/20; H04B 1/005;
           H04B 5/0012; H04B 5/0081; H04B
           7/0413; H04B 7/0608; H04B 1/0064;
           H04B 1/3838; H03H 9/725; H03H
           2210/025; H01P 1/213; H03K 17/955;
           H03K 2217/94098
    See application file for complete search history.

(56) References Cited

U.S. PATENT DOCUMENTS

| | | |
|---|---|---|
| 2012/0207235 A1 | 8/2012 | Pan et al. |
| 2013/0016633 A1 | 1/2013 | Lum et al. |
| 2014/0087786 A1* | 3/2014 | Tani ................ H01Q 1/245 455/556.1 |
| 2014/0155000 A1 | 6/2014 | Erkens |
| 2015/0295304 A1* | 10/2015 | Bengtsson ............ H01Q 1/243 343/718 |
| 2015/0372371 A1 | 12/2015 | Lagnado et al. |
| 2016/0381618 A1* | 12/2016 | Sayem ................ H01Q 21/30 370/329 |

FOREIGN PATENT DOCUMENTS

| | | |
|---|---|---|
| CN | 104378086 A | 2/2015 |
| CN | 104617907 A | 5/2015 |
| CN | 205017319 U | 2/2016 |
| CN | 106953648 A | 7/2017 |
| KR | 100862886 B1 * | 10/2008 |

OTHER PUBLICATIONS

First CN Office Action related to Application No. 201710114963.8 dated Aug. 27, 2018.
European Search Report Application. No. EP 17898854.9 dated Jan. 20, 2020.

* cited by examiner

MULTIPLEXED ANTENNA AND METHOD FOR MULTIPLEXING ANTENNA

CROSS-REFERENCE TO RELATED APPLICATION

This patent application is a 35 USC § 371 U.S. national stage of International Application No. PCT/CN2017/119088 filed on Dec. 27, 2017, which claims a priority of the Chinese Patent Application No. 201710114963.8 filed in China on Feb. 28, 2017, the disclosures of which are incorporated herein by reference in their entirety.

TECHNICAL FIELD

The present disclosure relates to the field of communication technology, in particular to a multiplexed antenna and a method for multiplexing an antenna.

BACKGROUND

Common application scenarios of a capacitive sensor in a mobile terminal include: (1) detecting a distance to a human body by means of the capacitive sensor, and reducing a transmission power of the antenna when the human body is close to the mobile terminal, to minimize an effect on the human body; (2) detecting that the mobile terminal is hold in left hand or right hand by means of the capacitive sensor, to facilitate switch of left-hand and right-hand modes of an interface of the mobile terminal.

In related technologies, the capacitive sensor and the antenna are generally independent and separate modules or modules assembled together. The two units in the mobile terminal take up a lot of space, and have a high cost. Further, due to the two units are in close proximity, the capacitive sensor has a significant impact on the performance of the antenna.

SUMMARY

To address the problem that too much space is occupied by the antenna and the capacitive sensor which are independent, embodiments of the present disclosure provide a multiplexed antenna and a method for multiplexing an antenna.

According to a first aspect of the embodiments of the present disclosure, a multiplexed antenna is provided, including an antenna unit and a signal separation circuit.

The antenna unit is connected to a signal input terminal of the signal separation circuit, and configured to receive a superposition signal and send the superposition signal as received to the signal separation circuit via the signal input terminal.

The signal separation circuit is configured to separate the superposition signal into an antenna signal and a capacitive sensor signal.

A first output terminal of the signal separation circuit is connected to an antenna signal receiving terminal, and configured to input the separated antenna signal to the antenna signal receiving terminal.

A second output terminal of the signal separation circuit is connected to a capacitive sensor signal receiving terminal, and configured to input the separated capacitive sensor signal to the capacitive sensor signal receiving terminal.

According to another aspect of the embodiments of the present disclosure, a method for multiplexing an antenna is provided, the method including:

receiving a superposition signal of an antenna signal and a capacitive sensor signal; and extracting the antenna signal and the capacitive sensor signal respectively from the superposition signal in accordance with operating frequencies of an antenna unit and a capacitive sensor in the multiplexed antenna.

According to the embodiments of the present disclosure, the multiplexed antenna includes the antenna unit and the signal separation circuit; the antenna unit is configured to receive and send the superposition signal to the signal separation circuit; and the signal separation circuit is configured to separate the superposition signal into the antenna signal and the capacitive sensor signal, and configured to input the separated antenna signal to the antenna signal receiving terminal and input the separated capacitive sensor signal to the capacitive sensor signal receiving terminal.

The foregoing description is merely a general description of the technical solutions of the present disclosure, and the detailed descriptions of the embodiments of the present disclose are provided below, to make the technical means of the present disclosure clearer and implementable in accordance with the specification and to facilitate the understanding of the foregoing and other objectives, features and advantages of the present disclosure.

BRIEF DESCRIPTION OF THE DRAWINGS

To illustrate the technical solutions in the embodiments of the present disclosure more clearly, drawings used in description of the embodiments are briefly introduced hereinafter. It is apparent that the accompanying drawings in the following description merely show some embodiments of the present disclosure, and a person of ordinary skill in the art can derive other drawings from these accompanying drawings without creative efforts.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

A multiplexed antenna provided by embodiments of the present disclosure is detailed hereinafter.

Figure 1:
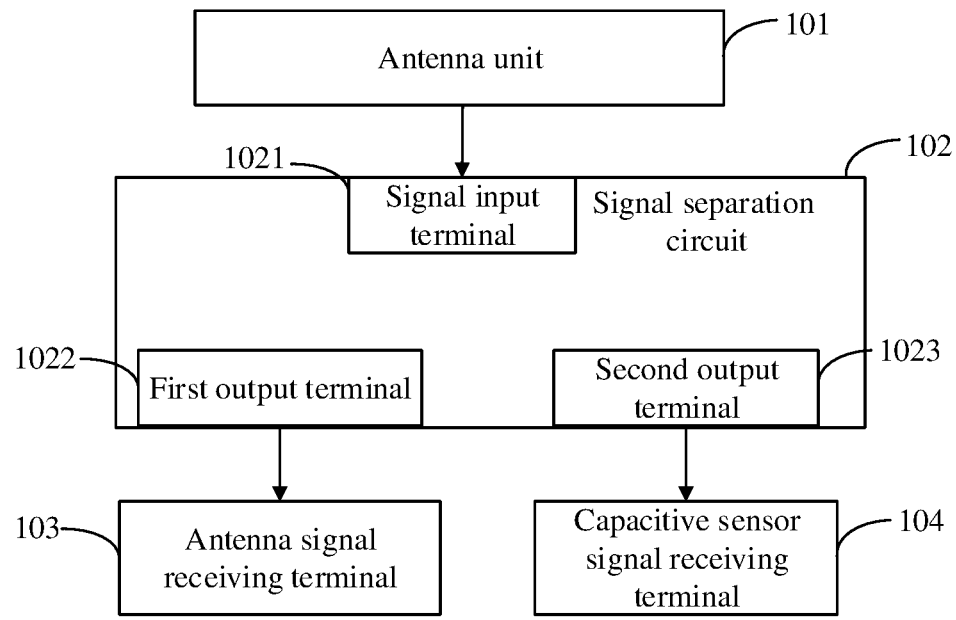
FIG. 1 is a schematic circuit diagram of a multiplexed antenna according to some embodiments of the present disclosure.

Referring to FIG. 1 in which a schematic circuit diagram of a multiplexed antenna according to some embodiments of the present disclosure is illustrated, the multiplexed antenna includes an antenna unit 101 and a signal separation circuit 102.

The antenna unit 101 is connected to a signal input terminal 1021 of the signal separation circuit, and configured to receive a superposition signal and send the superposition signal as received to the signal separation circuit via the signal input terminal.

In the embodiments, the multiplexed antenna has functions of both an antenna and a capacitive sensor, and the signal received by the antenna unit 101 is the superposition signal of an antenna signal and a capacitive sensor signal. The antenna unit 101 inputs the received superposition signal to the signal separation circuit via the signal input terminal of the signal separation circuit.

The signal separation circuit 102 is configured to separate the superposition signal into the antenna signal and the capacitive sensor signal.

In the embodiments, an operating frequency of the antenna unit of the mobile terminal ranges from 0.7 Ghz to 3 Ghz, and an operating frequency of the capacitive sensor is less than 10 Mhz. The operating frequency of the antenna unit differs greatly from that of the capacitive sensor. Therefore, after the signal separation circuit has received the superposition signal, the superposition signal may be separated into the antenna signal and the capacitive sensor signal in accordance with the operating frequencies of the antenna unit and the capacitive sensor.

A first output terminal 1022 of the signal separation circuit 102 is connected to an antenna signal receiving terminal 103, and configured to input the separated antenna signal to the antenna signal receiving terminal 103.

In the embodiments, the signal separation circuit extracts the antenna signal from the superposition signal and inputs the antenna signal to the antenna signal receiving terminal 103 from the first output terminal 1022, to achieve the transmission of the antenna signal.

A second output terminal 1023 of the signal separation circuit 102 is connected to a capacitive sensor signal receiving terminal 104, and configured to input the separated capacitive sensor signal to the capacitive sensor signal receiving terminal 104.

In the embodiments, the signal separation circuit extracts the capacitive sensor signal from the superposition signal and inputs the capacitive sensor signal to the capacitive sensor signal receiving terminal 104 from the second output terminal 1023, to achieve the transmission of the capacitive sensor signal.

In summary, the multiplexed antenna according to the embodiments of the present disclosure includes the antenna unit and the signal separation circuit; the antenna unit is configured to receive and send the superposition signal to the signal separation circuit; and the signal separation circuit is configured to separate the superposition signal into the antenna signal and the capacitive sensor signal, and configured to input the separated antenna signal to the antenna signal receiving terminal and input the separated capacitive sensor signal to the capacitive sensor signal receiving terminal. The multiplexed antenna according to the embodiments of the present disclosure can act as both an antenna unit and a capacitive sensor. Since the antenna unit and the capacitive sensor are multiplexed, both occupied space and cost are reduced.

The multiplexed antenna provided by the embodiments of the present disclosure is detailed. The multiplexed antenna is deployed at a mobile terminal and includes the antenna unit 101 and the signal separation circuit 102.

Figure 2:
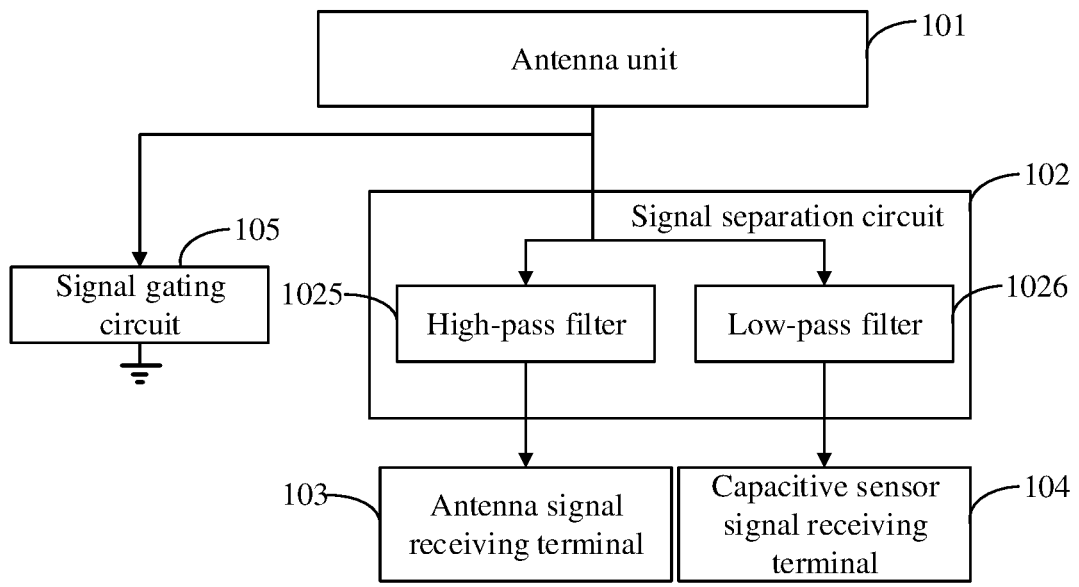
FIG. 2 is a schematic circuit diagram of a multiplexed antenna according to some embodiments of the present disclosure.

Optionally, the signal separation circuit includes a high-pass filter 1025 and a low-pass filter 1026, as shown in FIG. 2.

The high-pass filter 1025 has an input terminal connected to the antenna unit 101 and an output terminal connected to the antenna signal receiving terminal 103, and is configured to extract the antenna signal from the superposition signal by passing the antenna signal and filtering out the capacitive sensor signal in the superposition signal.

In the embodiments, since an operating frequency of the antenna signal ranges from 0.7 Ghz to 3 Ghz and an operating frequency of the capacitive sensor is less than 10 Mhz, once the superposition signal is input, the high-pass filter passes the antenna signal and filters out the capacitive sensor signal, thereby extracting the antenna signal in the superposition signal.

The low-pass filter 1026 has an input terminal connected to the antenna unit 101 and an output terminal connected to the capacitive sensor signal receiving terminal 104, and is configured to extract the capacitive sensor signal from the superposition signal by passing the capacitive sensor signal and filtering out the antenna signal in the superposition signal.

In the embodiments, since an operating frequency of the antenna signal ranges from 0.7 Ghz to 3 Ghz and an operating frequency of the capacitive sensor is less than 10 Mhz, once the superposition signal is input, the low-pass filter passes the capacitive sensor signal and filters out the antenna signal, thereby extracting the capacitive sensor signal in the superposition signal.

Figure 3:
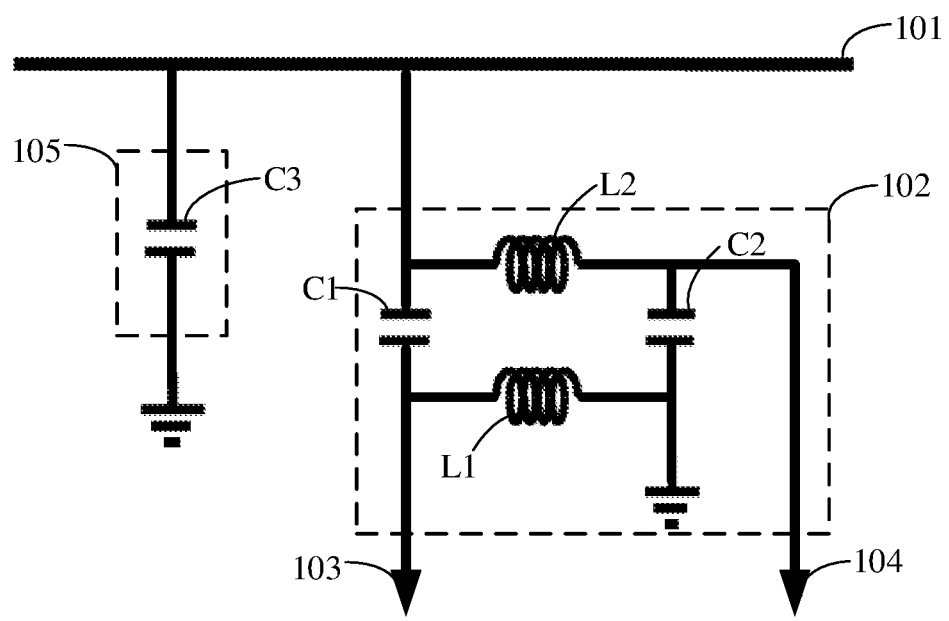
FIG. 3 is a schematic circuit diagram of a multiplexed antenna according to some embodiments of the present disclosure.
Figure 4:
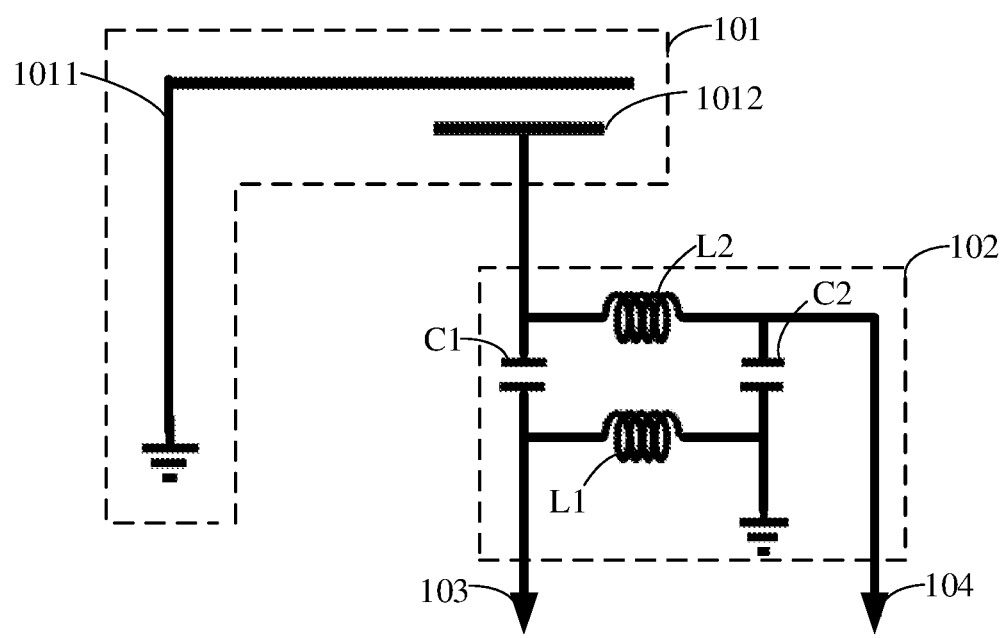
FIG. 4 is a schematic circuit diagram of a multiplexed antenna according to some embodiments of the present disclosure.

Optionally, the high-pass filter 1025 includes a first capacitor C1 and a first inductor L1, as shown in FIG. 3.

The first capacitor C1 has a terminal connected to the antenna unit 101 and the other terminal connected to the antenna signal receiving terminal 103 and the first inductor L1.

The first inductor L1 has a terminal connected to the antenna signal receiving terminal 103 and the first capacitor C1 and the other terminal connected to ground.

In the embodiments, the first capacitor C1 in the high-pass filter 1025 may have a capacitance of 33 pf and the first inductor L may have an inductance of 100 nH. The capacitance of the first capacitor C1 and the inductance of the first inductor L may be other values as well, and the capacitance and the inductance are not limited specifically in the embodiments of the present disclosure and may be set based on actual situations.

Optionally, the low-pass filter 1026 includes a second capacitor C2 and a second inductor L2, as shown in FIG. 3.

The second inductor L2 has a terminal connected to the antenna unit 101 and the other terminal connected to the capacitive sensor signal receiving terminal 104 and the second capacitor C2.

The second capacitor C2 has a terminal connected to the capacitive sensor signal receiving terminal 104 and the second inductor L2 and the other terminal connected to ground.

In the embodiments, the second capacitor C2 in the low-pass filter 1026 may have a capacitance of 33 pf and the second inductor L2 may have an inductance of 100 nH. The capacitance of the second capacitor C2 and the inductance of the second inductor L2 may be other values as well, and the capacitance and the inductance are not limited specifically in the embodiments of the present disclosure and may be set based on actual situations.

Optionally, the multiplexed antenna further includes a signal gating circuit 105, as shown in FIG. 2.

The signal gating circuit 105 has an input terminal connected to the antenna unit 101 and an output terminal connected to ground, and is configured to input the antenna signal in the superposition signal to the ground so as to ground the antenna unit.

In the embodiments, the antenna unit 101 may be grounded via the signal gating circuit, e.g., by employing an Inverted-F Antenna (IFA) structure. Other grounding methods may be utilized, such as by adopting an antenna unit 101 having two branches: a ground branch 1011 and a coupling branch 1012, as shown in FIG. 3. The ground branch 1011 causes the antenna unit 101 to be connected to ground, and the coupling branch 1012 has a capacitive coupling relation with the ground branch 1011 via a gap and is capable of transmitting and radiating the antenna signal. Furthermore, the coupling branch 1012 is not only a part of the antenna unit 1011, but also acts as the capacitive sensor. The type of antenna is not limited specifically in the embodiment of the present disclosure and may be chosen based on actual situations.

Optionally, the signal gating circuit 105 includes a third capacitor C3 to form a gating filter.

The third capacitor C3 has a terminal connected to the antenna unit 101 and the other terminal connected to the ground.

In the embodiments, the third capacitor C3 in the signal gating circuit 105 may have a capacitance of 33 pf. The capacitance of the third capacitor C3 may be other values as well, and the capacitance is not limited specifically in the embodiments of the present disclosure and may be set based on actual situations.

In summary, the multiplexed antenna according to the embodiments of the present disclosure includes the antenna unit and the signal separation circuit; the signal separation circuit includes the high-pass filter configured to extract the antenna signal and the low-pass filter configured to extract the capacitive sensor signal. The multiplexed antenna according to the embodiments of the present disclosure can separate the superposition signal into the antenna signal and the capacitive sensor signal, thereby acting as both an antenna unit and a capacitive sensor. Since the multiplexed antenna is reusable as the antenna unit and the capacitive sensor, both occupied space and cost are reduced.

Figure 5:
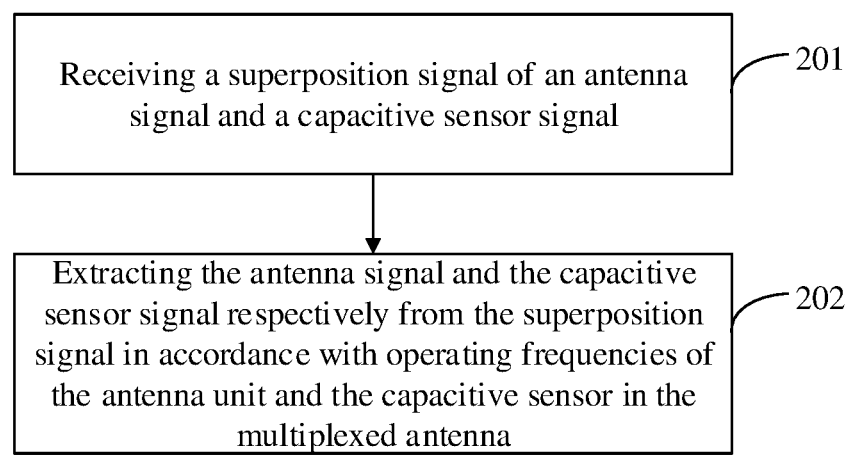
FIG. 5 is a flow chart of a method for multiplexing an antenna according to some embodiments of the present disclosure.

Referring to FIG. 5 in which a flow chart of a method for multiplexing an antenna according to some embodiments of the present disclosure is illustrated, the method is applicable to the multiplexed antenna described in the above embodiments, and the method includes step 201 and step 202.

In step 201, a superposition signal of an antenna signal and a capacitive sensor signal is received.

In the embodiments, the multiplexed antenna includes the antenna unit and the signal separation circuit; the antenna unit is configured to receive the superposition signal of the antenna signal and the capacitive sensor signal and send the superposition signal to the signal separation circuit.

Optionally, after receiving the superposition signal, the antenna unit inputs the antenna signal in the superposition signal to ground, such that the antenna unit in the multiplexed antenna is grounded. The antenna unit may be grounded via the signal gating circuit. The signal gating circuit is formed by capacitor, which may pass the high-frequency antenna signal and may be low capacitive or open-circuited for the low-frequency capacitive sensor signal, thus grounding the antenna unit. Or, the antenna unit may be divided into the ground branch and the coupling branch and be connected to ground via the ground branch. The type of antenna is not limited specifically in the embodiments of the present disclosure and may be chosen based on actual situations.

In step 202, the antenna signal and the capacitive sensor signal are respectively extracted from the superposition signal in accordance with operating frequencies of the antenna unit and the capacitive sensor in the multiplexed antenna.

In the embodiments, the signal separation circuit receives the superposition signal inputted by the antenna unit. Since an operating frequency of the antenna signal ranges from 0.7 Ghz to 3 Ghz and an operating frequency of the capacitive sensor is less than 10 Mhz, the antenna signal and the capacitive sensor signal can be extracted respectively from the superposition signal in accordance with the operating frequencies of the antenna unit and the capacitive sensor.

Optionally, the high-pass filter extracts the antenna signal from the superposition signal by passing the antenna signal and filtering out the capacitive sensor signal; and the low-pass filter extracts the capacitive sensor signal from the superposition signal by passing the capacitive sensor signal and filtering out the antenna signal. The high-pass filter and the low-pass filter are each formed by capacitor and inductor, where the capacitance may be 33 pf and the inductance may be 100 nH. The capacitance and the inductance are not limited specifically in the embodiments of the present disclosure and may be set based on actual situations.

The signal separation circuit extracts the antenna signal from the superposition signal and inputs the antenna signal to the antenna signal receiving terminal, thereby achieving the function of receiving the antenna signal. The signal separation circuit extracts the capacitive sensor signal from the superposition signal and inputs the capacitive sensor signal to the capacitive sensor signal receiving terminal, thereby achieving the function of receiving the capacitive sensor signal.

In summary, the multiplexed antenna according to the embodiments of the present disclosure receives the superposition signal of the antenna signal and the capacitive sensor signal; and extracts the antenna signal and the capacitive sensor signal respectively from the superposition signal in accordance with the operating frequencies of the antenna unit and the capacitive sensor in the multiplexed antenna. The multiplexed antenna according to the embodiments of the present disclosure can act as both an antenna unit and a capacitive sensor. Since the multiplexed antenna is reusable as the antenna unit and the capacitive sensor, both occupied space and cost are reduced.

It should be noted that, for purpose of simplicity of explanation, the method embodiments are shown and described as a series of actions, and those skilled in the art will appreciate that the present disclosure is not limited by the order of the actions, as some steps may occur in different orders or concurrently in accordance with the present disclosure. Moreover, it is to be appreciated by those skilled in the art that the embodiments described in the specification are merely some preferred embodiments, and not all illustrated actions are needed when implementing the present disclosure.

The embodiments provided in the specification are described in a progressive manner, the description of each embodiment focuses on its difference from other embodiments, and reference can be made to other embodiments for the same or similar part.

It will be appreciated by those skilled in the art that, any combinations of the aforementioned embodiments are possible, thus any combinations of the aforementioned embodiments belong to the solutions of the present disclosure, but detailed descriptions of these combinations are omitted herein for conciseness.

The solution for multiplexing the antenna provided herein is not inherently related to any specific computers, virtual systems or other equipment. Various generic systems may be used in conjunction with the teaching provided herein. The structure required to build the system according to the solution of the present disclosure is readily clear from the foregoing description. Further, the present disclosure is not directed to any specific programming languages. It should be appreciated that, the content of the present disclosure described herein may be implemented with various kinds of programming languages and the foregoing description of the specific language is merely for the purpose of disclosing the preferred implementation mode of the present disclosure.

Many details are discussed in the specification provided herein. However, it should be understood that the embodiments of the present disclosure can be implemented without these specific details. In some examples, the conventional methods, structures and technologies are not shown in detail so as to avoid an unclear understanding of the description.

Similarly, it should be understood that, in order to simplify the disclosure and to facilitate the understanding of one or more of various aspects thereof, in the description of the aforementioned exemplary embodiments of the present disclosure, various features of the present disclosure may sometimes be grouped together into a single embodiment, accompanying figure or description thereof. However, the method of the present disclosure should not be construed as follows: the present disclosure to be protected requires more features than those explicitly disclosed in each of claims. Rather, as reflected by the claims, inventive subject matter lies in less than all features of a single disclosed embodiment. Therefore, the claims conforming to specific embodiments are explicitly incorporated into the specific embodiments, where each claim can be considered as a separate embodiment of the present disclosure.

Those of ordinary skill in the art will recognize that, the exemplary units and algorithm steps of the various embodiments described above, may be implemented by electronic hardware, or by a combination of computer software and electronic hardware. Whether these functions are implemented by hardware or software depends on the specific application and design constraints of the solution. A skilled person may use different methods to implement the described functions for each particular application, and such implementations are not to be considered as departing from the scope of the present disclosure.

The skilled person should appreciate that, for the sake of easiness and conciseness of description, the specific operating processes of the aforementioned systems, devices and units may be understood by referring to the corresponding processes of the foregoing method embodiments, and a repeated description thereof is omitted herein.

It should be appreciated that the device and method disclosed in the embodiments provided by this application may be implemented by other means. For example, the aforementioned device embodiment is merely illustrative, e.g., the units are merely divided in logic function, which may be divided in another way in actual implementation, such as multiple units or components may be combined or integrated into another system, or some features may be ignored or not performed. Furthermore, the shown or discussed mutual coupling or direct coupling or communication connection can be achieved by indirect coupling or communication connection through some interfaces, devices or units, which may be implemented in electric, mechanical or other ways.

The units described as separate components may be or not be physically separated, and the components displayed as units may or may not be physical units, that is, may be located in one place, or may be distributed over a plurality of network units. Some or all of the units may be selected according to actual needs to realize the object of the solution of the embodiments.

Additionally, the functional units in the various embodiments of the present disclosure may be integrated in one processing unit, or each unit may be physically present alone, or two or more units may be integrated in one unit.

If the function is implemented in the form of a software functional unit, and sold or used as a standalone product, the unit may be stored in a computer-readable storage medium. Based on this understanding, essence of the technical solution of the antenna multiplexing of the present disclosure, or the part contributing to the related technologies, or part of the technical solution, can be embodied in the form of a software product. The computer software product is stored in a storage media, and the computer software product includes a number of instructions to enable a computer device (which may be a personal computer, server, or network device, etc.) to perform all or part of the steps of the method described in the various embodiments of the present disclosure. The storage medium includes a USB flash disk, a mobile hard disk, a read-only memory (ROM), a random access memory (RAM), a magnetic disk, an optical disk, and other medium which can store program code.

The aforementioned are merely specific implementations of the present disclosure, and the protection scope of the present disclosure is not limited thereto. Any modifications or replacements that would easily occur to those skilled in the art, without departing from the technical scope disclosed in the present disclosure, should be encompassed in the scope of the present disclosure. Therefore, the scope of the present disclosure is to be determined by the scope of the claims.

What is claimed is:

1. A multiplexed antenna, comprising an antenna unit and a signal separation circuit, wherein
   the antenna unit is connected to a signal input terminal of the signal separation circuit, and configured to receive a superposition signal and send the superposition signal as received to the signal separation circuit via the signal input terminal;
   the signal separation circuit is configured to separate the superposition signal into an antenna signal and a capacitive sensor signal;
   a first output terminal of the signal separation circuit is connected to an antenna signal receiving terminal, and configured to input the separated antenna signal to the antenna signal receiving terminal;
   a second output terminal of the signal separation circuit is connected to a capacitive sensor signal receiving terminal, and configured to input the separated capacitive sensor signal to the capacitive sensor signal receiving terminal;
   wherein the antenna unit comprises a ground branch and a coupling branch;
   wherein the ground branch is configured to ground the antenna unit;

wherein the coupling branch has a capacitive coupling relation with the ground branch, and the coupling branch is connected to the signal input terminal of the signal separation circuit.

2. The multiplexed antenna according to claim 1, wherein the signal separation circuit comprises a high-pass filter and a low-pass filter;
the high-pass filter has an input terminal connected to the antenna unit, and an output terminal connected to the antenna signal receiving terminal, and is configured to extract the antenna signal from the superposition signal by passing the antenna signal and filtering out the capacitive sensor signal in the superposition signal; and
the low-pass filter has an input terminal connected to the antenna unit, and an output terminal connected to the capacitive sensor signal receiving terminal, and is configured to extract the capacitive sensor signal from the superposition signal by passing the capacitive sensor signal and filtering out the antenna signal in the superposition signal.

3. The multiplexed antenna according to claim 2, wherein the high-pass filter comprises a first capacitor and a first inductor;
the first capacitor has a terminal connected to the antenna unit, and another terminal connected to the antenna signal receiving terminal and the first inductor; and
the first inductor has a terminal connected to the antenna signal receiving terminal and the first capacitor, and another terminal connected to ground.

4. The multiplexed antenna according to claim 2, wherein the low-pass filter comprises a second capacitor and a second inductor;
the second inductor has a terminal connected to the antenna unit, and another terminal connected to the capacitive sensor signal receiving terminal and the second capacitor; and
the second capacitor has a terminal connected to the capacitive sensor signal receiving terminal and the second inductor, and another terminal connected to ground.

5. A method for multiplexing an antenna, applied to a multiplexed antenna, wherein the multiplexed antenna comprises an antenna unit and a signal separation circuit;
the antenna unit is connected to a signal input terminal of the signal separation circuit, and configured to receive a superposition signal and send the superposition signal as received to the signal separation circuit via the signal input terminal;
the signal separation circuit is configured to separate the superposition signal into an antenna signal and a capacitive sensor signal;
a first output terminal of the signal separation circuit is connected to an antenna signal receiving terminal, and configured to input the separated antenna signal to the antenna signal receiving terminal;
a second output terminal of the signal separation circuit is connected to a capacitive sensor signal receiving terminal, and configured to input the separated capacitive sensor signal to the capacitive sensor signal receiving terminal;
the antenna unit comprises a ground branch and a coupling branch, the ground branch is configured to ground the antenna unit, the coupling branch has a capacitive coupling relation with the ground branch, and the coupling branch is connected to the signal input terminal of the signal separation circuit;
the method comprises:
receiving the superposition signal of the antenna signal and the capacitive sensor signal; and
extracting the antenna signal and the capacitive sensor signal respectively from the superposition signal in accordance with operating frequencies of the antenna signal and the capacitive sensor signal in the multiplexed antenna.

6. The method according to claim 5, wherein extracting the antenna signal and the capacitive sensor signal respectively from the superposition signal in accordance with the operating frequencies of the antenna signal and the capacitive sensor signal in the multiplexed antenna comprises:
extracting the antenna signal from the superposition signal via a high-pass filter; and
extracting the capacitive sensor signal from the superposition signal via a low-pass filter.

7. The method according to claim 5, wherein the signal separation circuit comprises a high-pass filter and a low-pass filter;
the high-pass filter has an input terminal connected to the antenna unit, and an output terminal connected to the antenna signal receiving terminal, and is configured to extract the antenna signal from the superposition signal by passing the antenna signal and filtering out the capacitive sensor signal in the superposition signal; and
the low-pass filter has an input terminal connected to the antenna unit, and an output terminal connected to the capacitive sensor signal receiving terminal, and is configured to extract the capacitive sensor signal from the superposition signal by passing the capacitive sensor signal and filtering out the antenna signal in the superposition signal.

8. The method according to claim 7, wherein the high-pass filter comprises a first capacitor and a first inductor; the first capacitor has a terminal connected to the antenna unit, and another terminal connected to the antenna signal receiving terminal and the first inductor; and the first inductor has a terminal connected to the antenna signal receiving terminal and the first capacitor, and another terminal connected to ground;
wherein the low-pass filter comprises a second capacitor and a second inductor; the second inductor has a terminal connected to the antenna unit, and another terminal connected to the capacitive sensor signal receiving terminal and the second capacitor; and the second capacitor has a terminal connected to the capacitive sensor signal receiving terminal and the second inductor, and another terminal connected to ground.

9. The method according to claim 7, wherein extracting the antenna signal and the capacitive sensor signal respectively from the superposition signal in accordance with the operating frequencies of the antenna signal and the capacitive sensor signal in the multiplexed antenna comprises:
extracting the antenna signal from the superposition signal via the high-pass filter; and extracting the capacitive sensor signal from the superposition signal via the low-pass filter.

10. The method according to claim 8, wherein extracting the antenna signal and the capacitive sensor signal respectively from the superposition signal in accordance with the operating frequencies of the antenna signal and the capacitive sensor signal in the multiplexed antenna comprises:
extracting the antenna signal from the superposition signal via the high-pass filter; and extracting the capacitive sensor signal from the superposition signal via the low-pass filter.

* * * * *